(12) United States Patent
Park et al.

(10) Patent No.: US 11,513,402 B2
(45) Date of Patent: Nov. 29, 2022

(54) AUXILIARY COUPLING LAYER BETWEEN DISPLAY PANEL AND CIRCUIT MEMBER AND DISPLAY DEVICE HAVING THE SAME

(71) Applicant: Samsung Display Co., LTD., Yongin-si (KR)

(72) Inventors: Young-Min Park, Yongin-si (KR); Jeongjin Park, Hwaseong-si (KR); Si joon Song, Suwon-si (KR); Sanghyuck Yoon, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/000,465

(22) Filed: Aug. 24, 2020

(65) Prior Publication Data
US 2021/0063792 A1  Mar. 4, 2021

(30) Foreign Application Priority Data
Aug. 30, 2019 (KR) .................. 10-2019-0107463

(51) Int. Cl.
*G02F 1/1345* (2006.01)
(52) U.S. Cl.
CPC ........ *G02F 1/1345* (2013.01); *G02F 1/13458* (2013.01)
(58) Field of Classification Search
CPC combination set(s) only.
See application file for complete search history.

(56) References Cited

U.S. PATENT DOCUMENTS

| 5,416,622 A * | 5/1995 | Engfer ............... H01R 4/04 349/149 |
| 2018/0063962 A1 | 3/2018 | Lee et al. |
| 2018/0088388 A1 | 3/2018 | Furuta |
| 2018/0088389 A1 * | 3/2018 | Furuta ............... B23K 1/0008 |
| 2018/0307084 A1 | 10/2018 | Lee et al. |

FOREIGN PATENT DOCUMENTS

| JP | 2002-252437 A | 9/2002 |
| KR | 1020170069042 A | 6/2017 |
| KR | 1020180119728 A | 11/2018 |
| KR | 10-1955531 B1 | 2/2019 |

OTHER PUBLICATIONS

European Search Report for European Patent Application No. 20192646.6 dated Nov. 23, 2020.

* cited by examiner

*Primary Examiner* — Lauren Nguyen
(74) *Attorney, Agent, or Firm* — Cantor Colburn LLP

(57) ABSTRACT

A display device includes a display panel including a side surface; on the side surface of the display panel: a pad through which an electrical signal is provided to the display panel from outside thereof; and an auxiliary layer in a same layer as the pad and spaced apart from the pad along a thickness direction of the display panel; and a circuit member facing the side surface of the display panel and coupled to both the pad and the auxiliary layer.

19 Claims, 9 Drawing Sheets

AUXILIARY COUPLING LAYER BETWEEN DISPLAY PANEL AND CIRCUIT MEMBER AND DISPLAY DEVICE HAVING THE SAME

This patent application claims priority to Korean Patent Application No. 10-2019-0107463, filed on Aug. 30, 2019, and all the benefits accruing therefrom under 35 U.S.C. § 119, the entire contents of which are hereby incorporated by reference.

BACKGROUND

(1) Field

The present disclosure herein relates to a display device with improved reliability.

(2) Description of the Related Art

A display device includes a display panel including a plurality of pixels and a drive chip for driving the pixels. The drive chip is disposed on a flexible film, and the flexible film is connected to the display panel. The drive chip is connected to the pixels of the display panel through the flexible film. This connection method is defined as a chip-on-film method. The drive chip and the flexible film together may be referred to as a circuit unit (or circuit member).

A plurality of electrodes connected to the drive chip is disposed on the flexible film, and a plurality of pads electrically connected to the pixels is disposed on one surface of the display panel. The pads contact and are connected to the electrodes respectively, and thus, the drive chip is electrically connected to the pixels. The pads and the electrodes are connected to each other in various methods. For example, the pads and the electrodes may be electrically connected to each other by an anisotropic conductive film. Alternatively, the pads and the electrodes may be connected to each other in an ultrasonic bonding method.

SUMMARY

One or more embodiment provides a display device with a reduced bezel width.

In addition, one or more embodiment provides a display device with improved reliability.

An embodiment provides a display device including: a display panel including a side surface; on the side surface of the display panel: a pad through which an electrical signal is provided to the display panel from outside thereof; and an auxiliary layer in a same layer as the pad and spaced apart from the pad along a thickness direction of the display panel; and a circuit member facing the side surface of the display panel and coupled to both the pad and the auxiliary layer.

In an embodiment, the circuit member may include an electrode facing the pad and an auxiliary electrode facing the auxiliary layer.

In an embodiment, the auxiliary layer and the pad may include a same material as each other, the electrode and the auxiliary electrode may include a same material as each other, and a shape of the auxiliary electrode may correspond to a shape of the auxiliary layer.

In an embodiment, the pad may be directly coupled to the electrode, and the auxiliary layer may be directly coupled to the auxiliary electrode.

In an embodiment, the display device may further include an anisotropic conductive film which is between the pad and the electrode and couples the pad to the electrode.

In an embodiment, the pad may be provided in plural including a plurality of pads spaced apart from each other and defining a space between adjacent pads. The display device may further include at the space between the adjacent pads, a filling layer between the circuit member and the display panel.

In an embodiment, the plurality of pads may be arranged along a first direction crossing the thickness direction of the display panel, and a width in the first direction of each of the plurality of pads may be smaller than a width in the first direction of the auxiliary layer.

In an embodiment, the auxiliary layer may surround at least a portion of an area where a plurality of pads is disposed.

In an embodiment, the plurality of pads may be arranged in a first direction crossing the thickness direction of the display panel, and the auxiliary layer may extend in the first direction be disposed to be spaced apart from the plurality of pads along the thickness direction.

In an embodiment, the plurality of pads may be arranged in a first direction crossing the thickness direction of the display panel, and the auxiliary layer may include a first auxiliary region extended along the first direction and spaced apart from each of the plurality of pads along the thickness direction of the display panel, a second auxiliary region extended along the thickness direction of the display panel, from a first end of the first auxiliary region, and spaced apart from the plurality of pads along the first direction, and a third auxiliary region extended along the thickness direction of the display panel, from a second end of the first auxiliary region which is opposite to the first end thereof, and spaced apart from the plurality of pads along the first direction. The first auxiliary region may connect the second auxiliary region and the third auxiliary region to each other.

In an embodiment, the auxiliary layer may further include a fourth auxiliary region which connects the second auxiliary region and the third auxiliary region to each other, the fourth auxiliary region facing the first auxiliary region with the plurality of pads therebetween, and the plurality of pads may be surrounded by the auxiliary layer including the first auxiliary region, the second auxiliary region, the third auxiliary region, and the fourth auxiliary region.

In an embodiment, the display panel may include a first substrate including a side surface, and a second substrate facing the first substrate and including a side surface, and at the side surface of the display panel, the pad may correspond to the side surface of the first substrate, and the auxiliary layer may correspond to the side surface of the second substrate.

In an embodiment, the display panel may include a first substrate including a side surface, and a second substrate facing the first substrate and including a side surface, and at the side surface of the display panel, the pad may correspond to both the side surface of the first substrate and the side surface of the second substrate, and the auxiliary layer may correspond to both the side surface of the first substrate and the side surface of the second substrate.

In an embodiment, the display panel may include an image display surface defining a top surface, and a bottom surface which is opposite to the top surface along the thickness direction of the display panel, and along the thickness direction of the display panel, the auxiliary layer may be between the top surface and the pad.

In an embodiment, a display device includes: a display panel including a side surface; on the side surface of the display panel: a plurality of pads arranged spaced apart from each other along a first direction and through which an electrical signal is provided to the display panel from outside thereof; and an auxiliary layer spaced apart from the plurality of pads, the auxiliary layer including a first auxiliary region extending in the first direction along the plurality of pads; and a circuit member facing each of the plurality of pads and the auxiliary layer and electrically connected to the display panel at the plurality of pads.

In an embodiment, the circuit member may include a plurality of electrodes corresponding to the plurality of pads and an auxiliary electrode corresponding to the auxiliary layer, where the plurality of pads and the auxiliary layer include a same material as each other, and the plurality of electrodes and the auxiliary electrode include a same material as each other.

In an embodiment, at a space between the plurality of pads, the display device may further include a filling layer between the circuit member and the display panel.

In an embodiment, the display panel may include an image display surface defining a top surface, and a bottom surface which is opposite to the top surface along a thickness direction of the display panel which crosses the first direction, and along the thickness direction of the display panel, the auxiliary layer may be disposed between the top surface and the plurality of pads.

In an embodiment, the auxiliary layer may include a second auxiliary region extended along the thickness direction, from a first end of the first auxiliary region, and spaced apart from the plurality of pads along the first direction, and a third auxiliary region extended along the thickness direction from a second end of the first auxiliary region which is opposite to the first end thereof, and spaced apart from the plurality of pads along the first direction. The first auxiliary region may connect the second auxiliary region and the third auxiliary region to each other.

In an embodiment, the auxiliary layer may further include a fourth auxiliary region connecting the second auxiliary region and the third auxiliary region to each other, and spaced apart from the first auxiliary region with the plurality of pads therebetween. The plurality of pads may be surrounded by the auxiliary layer including the first auxiliary region, the second auxiliary region, the third auxiliary region, and the fourth auxiliary region.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to describe principles of the invention. In the drawings.

DETAILED DESCRIPTION

Figure 1:
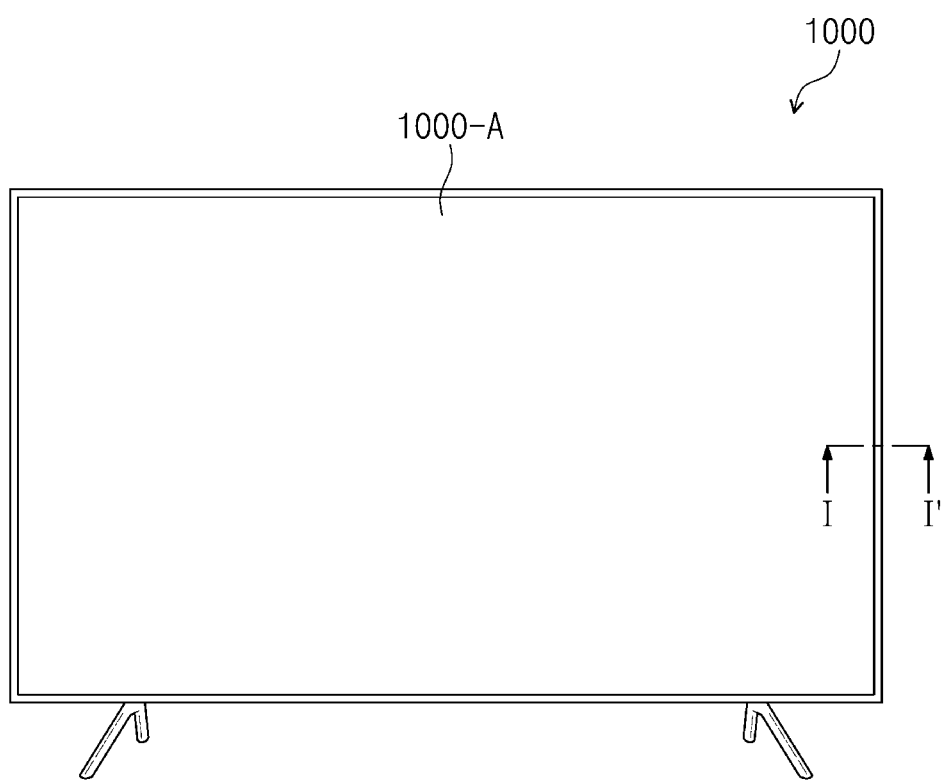
FIG. 1 is a perspective plan view of an embodiment of a display device.
Figure 1:
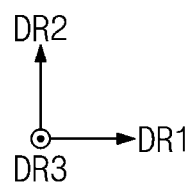

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element or layer is referred to as being related to another element such as being "on," "connected to" or "coupled to" another element or layer, it can be directly on, connected or coupled to the other element or layer, or intervening elements or layers may be present. In contrast, when an element or layer is referred to as being related to another element such as being "directly on," "directly connected to" or "directly coupled to" another element or layer, no intervening elements or layers are present.

Like reference numerals refer to like elements throughout this specification. In the figures, the thicknesses, ratios and dimensions of elements are exaggerated for effective description of the technical contents.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention. As used herein, the singular forms, "a", "an" and "the" are intended to include the plural forms as well, unless the context clearly indicates otherwise.

Spatially relative terms, such as "beneath," "below," "lower," "above" and "upper", may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "comprise," "include" or "have," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the present invention will be explained in detail with reference to the accompanying drawings.

Figure 2:
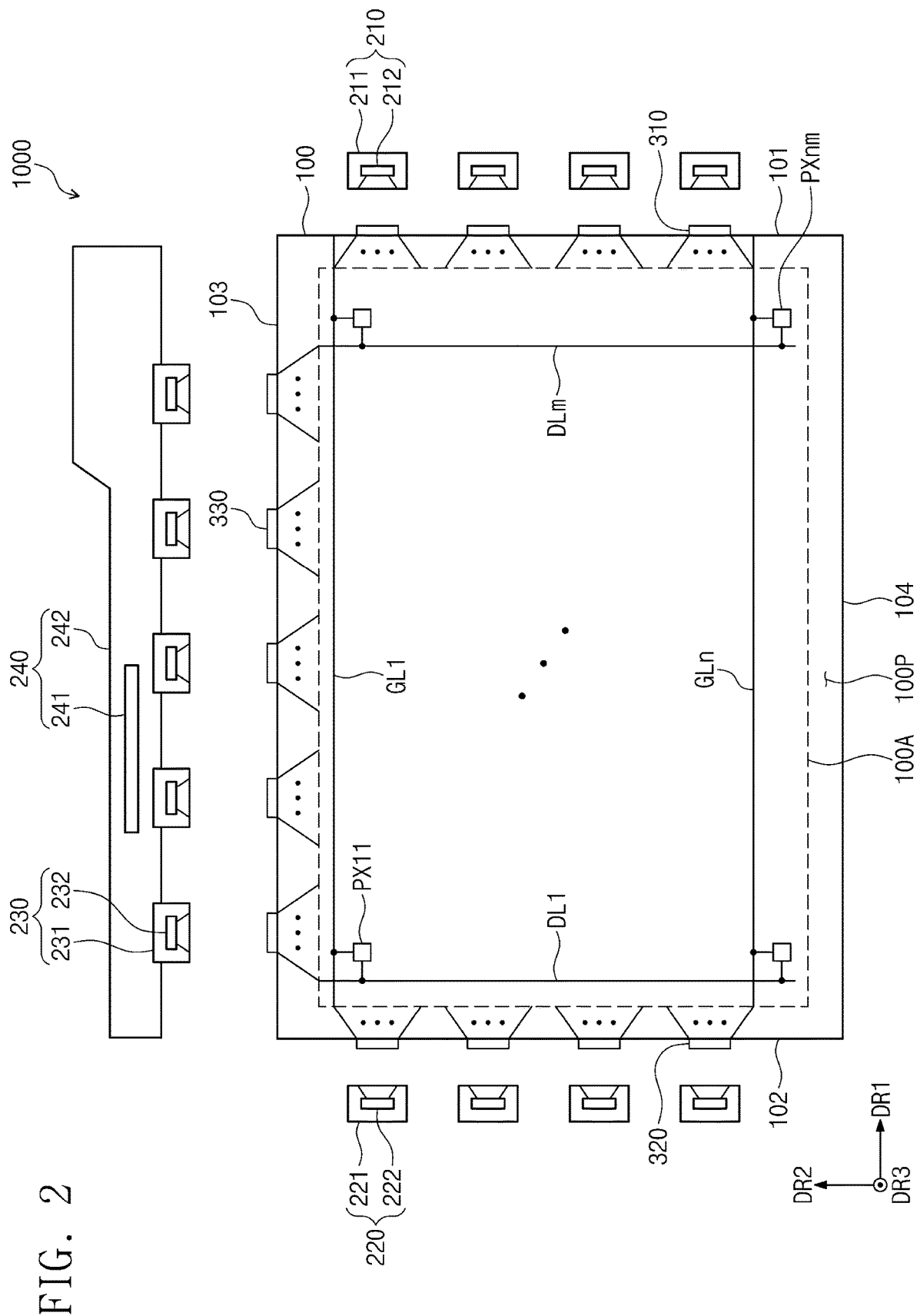
FIG. 2 is a plan view of an embodiment of a display device.

FIG. 1 is a top plan view of an embodiment of a display device 1000. FIG. 2 is a top-plan view of an embodiment of the display device 1000.

Referring to FIGS. 1 and 2, the display device 1000 may be a device that is activated according to an electrical signal. The display device 1000 may include various embodiments. The display device 1000, for example, may be used in a relatively large-sized electronic device such as a television, a monitor and an outdoor digital signage, and a relatively medium- and/or small-sized electronic device such as a personal computer, a laptop computer, a personal digital assistant, a car navigation device, a game machine, a portable electronic device and a camera. These are merely embodiments, and the display device 1000 may also be employed in other electronic devices as long as the display device 1000 does not depart from the invention.

The display device 1000 may display an image toward a third direction DR3. The image may be displayed on a display surface 1000-A (e.g., image display surface) disposed in a plane which is parallel to a plane defined by a first direction DR1 and a second direction DR2 crossing each other. The image may include a still image in addition to a dynamic image. The third direction DR3 may cross each of the first direction DR1 and the second direction DR2. A thickness direction of the display device 1000 and components thereof may be defined along the third direction DR3.

A bezel of the display device 1000 may be defined as a region between an outer edge of the display surface 1000-A and an outermost edge of the display device 1000. When a width of the bezel decreases, a ratio of a planar area of the display surface 1000-A to a planar area of a surface of the display device 1000 may increase. In addition, when the display device 1000 is provided in plurality including a plurality of display devices 1000, and the plurality of display devices 1000 are connected to each other so as to form a single display screen such as a video wall, a boundary between the display devices 1000 which are adjacent to each other may be less visible as a size of the bezel decreases, resulting in an effect of a single connected screen for viewing of an image.

The display device 1000 may include a display panel 100, a first circuit unit 210 (e.g., circuit member) provided in plural (e.g., first circuit units 210), a second circuit unit 220 provided in plural (e.g., second circuit units 220), a third circuit unit 230 provided in plural (e.g., third circuit units 230), a main circuit unit 240 (e.g., main circuit member), a first pad part 310 (e.g., first pad) provided in plural (e.g., first pad parts 310 or first pads), a second pad part 320 (e.g., second pad) provided in plural (e.g., second pad parts 320 or second pads), and a third pad part 330 (e.g., third pad) provided in plural (e.g., third pad parts 330 or third pads).

An active region 100A and a peripheral region 100P may be defined in the display panel 100. The active region 100A may be a region that is activated according to an electrical signal. In an embodiment, for example, the active region 100A may be a region in which an image is generated and/or displayed or at which light is generated and/or emitted such as for displaying an image. The peripheral region 100P may be adjacent to the active region 100A. The peripheral region 100P may surround at least a portion of the active region 100A. A drive circuit, drive wiring or the like for driving the active region 100A may be disposed in the peripheral region 100P. Elements in the active region 100A may be connected to elements in the peripheral region 100P, such that the peripheral region 100P drives the active region 100A.

The display panel 100 may include a pixel provided in plural (e.g., pixels PX11 to PXnm), a gate line provided in plural (e.g., gate lines GL1 to GLn), and a data line provided in plural (e.g., data lines DL1 to DLm). The pixels PX11 to PXnm, the gate lines GL1 to GLn, and the data lines DL1 to DLm may be arranged in the active region 100A. The gate line and the data line may otherwise be referred to as a signal line through which an electrical signal is transmitted.

Each of the gate lines GL1 to GLn may extend along the first direction DR1, and the gate lines GL1 to GLn may be arranged to be spaced apart from each other along the second direction DR2. Each of the data lines DL1 to DLm may extend along the second direction DR2, and the data lines DL1 to DLm may be arranged to be spaced apart from each other along the first direction DR1. Each of the pixels PX11 to PXnm may be electrically connected to a corresponding one of the data lines DL1 to DLm and a corresponding one of the gate lines GL1 to GLn.

The display panel 100 may include a plurality of side surfaces, which may be otherwise referred to as an outer side surface. The display panel 100 may include a first side surface 101 (e.g., a first side), a second side surface 102 (e.g., a second side), a third side surface 103 (e.g., a third side), and a fourth side surface 104 (e.g., a fourth side). The first side surface 101 and the second side surface 102 may be spaced apart from each other along the first direction DR1, and each of the first side surface 101 and the second side surface 102 may extend along the second direction DR2. Each of the third side surface 103 and the fourth side surface 104 may connect the first side surface 101 and the second side surface 102 to each other. The third side surface 103 and the fourth side surface 104 may be spaced apart from each other along the second direction DR2, and each of the third side surface 103 and the fourth side surface 104 may extend along the first direction DR1. A thickness direction of the display panel 100 and components thereof may be defined along the third direction DR3.

The first pad parts 310 may be disposed along the first side surface 101, the second pad parts 320 may be disposed along the second side surface 102, and the third pad parts 330 may be disposed along the third side surface 103. The first pad parts 310 and the second pad parts 320 may be arranged along the second direction DR2, and the third pad parts 330 may be arranged along the first direction DR1.

The first pad parts 310 and the second pad parts 320 may be electrically connected to corresponding gate lines among the gate lines GL1 to GLn. The third pad parts 330 may be electrically connected to corresponding data lines among the data lines DL1 to DLm.

The first circuit units 210 may be electrically connected to the first pad parts 310, respectively, the second circuit units 220 may be electrically connected to the second pad parts 320, respectively, and the third circuit units 230 may be electrically connected to the third pad parts 330, respectively. The first circuit units 210, the second circuit units 220 and the third circuit units 230 may be considered an element which is outside of or external to the display panel 100.

In an embodiment, an auxiliary layer 400 may be provided on at least one of the first side surface 101, the second side surface 102 and the third side surface 103. The auxiliary layer 400 may be a layer provided to improve a coupling force between the display panel 100 and the first circuit units 210, the second circuit units 220 and the third circuit units 230. A detailed description of the auxiliary layer 400 will be given later.

The first circuit units 210 and the second circuit units 220 together may be referred to as a gate drive circuit. The third circuit units 230 together may be referred to as a data drive circuit. In addition, the first to third circuit units 210, 220 and 230 may be respectively referred to as first to third flexible circuit films or first to third chips-on-film.

Each of the first circuit units 210 may include a first circuit film 211 and a first drive chip 212, each of the second circuit units 220 may include a second circuit film 221 and a second drive chip 222, and each of the third circuit units 230 may include a third circuit film 231 and a third drive chip 232.

FIG. 2 illustrates one gate line GL1 corresponding to both a first circuit unit 210 and a second circuit unit 220 as an example, but the invention is not limited thereto. In an embodiment, for example, odd-numbered gate lines of the gate lines GL1 to GLn may correspond to and/or be electrically connected to the first circuit units 210, and even-numbered gate lines of the gate lines GL1 to GLn may correspond to and/or be electrically connected to the second circuit units 220. Further, in an embodiment, the second circuit units 220 and the second pad parts 320 may be omitted. In this case, all of the gate lines GL1 to GLn may be electrically connected to the first circuit units 210 through the first pad parts 310.

The main circuit unit 240 may be considered an element which is outside of or external to the display panel 100. The main circuit unit 240 may include a signal control unit 241 and a main circuit board 242. The signal control unit 241 may be referred to as a timing controller. The signal control unit 241 may be provided in the form of an integrated circuit chip and may be mounted on the main circuit board 242. The signal control unit 241 may be electrically connected to the first circuit units 210 and/or the second circuit units 220 through the third circuit units 230 and wires (not illustrated) disposed in the display panel 100.

The first circuit units 210 and the second circuit units 220 may receive a gate control signal as an electrical signal, from the signal control unit 241. The first circuit units 210 and the second circuit units 220 may generate gate signals in response to the gate control signal, and sequentially output the generated gate signals. The gate signals may be provided to the pixels PX11 to PXnm through the gate lines GL1 to GLn. The pixels PX11 to PXnm may be driven row by row in response to the gate signals.

The third circuit units 230 may receive image data and a data control signal as electrical signals, from the signal control unit 241. The third circuit units 230 generate and output analog data voltages corresponding to the image data in response to the data control signal. The data voltages may be provided to the pixels PX11 to PXnm through the data lines DL1 to DLm.

Figure 3:
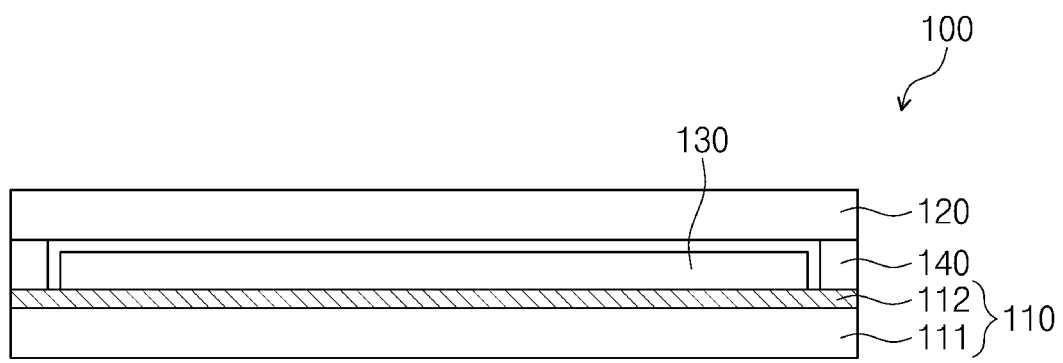
FIG. 3 is a cross-sectional view of an embodiment of a display panel.

FIG. 3 is a cross-sectional view of an embodiment of a the display panel 100.

Referring to FIG. 3, the display panel 100 may be a self-luminous display panel. The display panel 100 may include a first substrate 110, a second substrate 120 facing the first substrate 110, a light emitting element layer 130 (e.g., display element layer), and a bonding member 140. The display device 1000 may have side surfaces corresponding to the side surfaces described above for the display panel 100.

The first substrate 110 may include a base substrate 111 and a circuit layer 112.

The base substrate 111 may be a plastic substrate, a glass substrate, an insulating film, or a laminated structure including a plurality of insulating layers. The circuit layer 112 may be disposed on the base substrate 111. The circuit layer 112 may include a plurality of insulating layers, a plurality of conductive layers and a semiconductor layer. The plurality of conductive layers may constitute signal wires or a pixel control circuit.

The light emitting element layer 130 may be disposed on the circuit layer 112. The light emitting element layer 130 may be a layer that generates and emits light. In an embodiment, for example, the light emitting element layer 130 of an organic light emitting display device may include an organic light emitting material. The light emitting element layer 130 of a quantum dot light emitting display device may include a quantum dot or a quantum rod.

The second substrate 120 may be disposed facing the first substrate 110 with the light emitting element layer 130 therebetween. The second substrate 120 may be referred to as an encapsulation substrate. The second substrate 120 may be a plastic substrate, a glass substrate, an insulating film, or a laminated structure including a plurality of insulating layers.

The bonding member 140 may be disposed between the first substrate 110 and the second substrate 120. The bonding member 140 may be bonded to the first substrate 110 and the second substrate 120, to couple the first substrate 110 and the second substrate 120 to each other. The bonding member 140 may include an organic material such as a photocurable resin and a photoplastic resin, or may include an inorganic material such as a frit seal, and is not limited to any one embodiment.

A space may be defined between the second substrate 120 and the light emitting element layer 130. The space may be filled with air or an inert gas. Alternatively, the space may also be filled with a filler such as a silicone-based polymer, an epoxy-based resin, and an acrylic resin.

Figure 4:
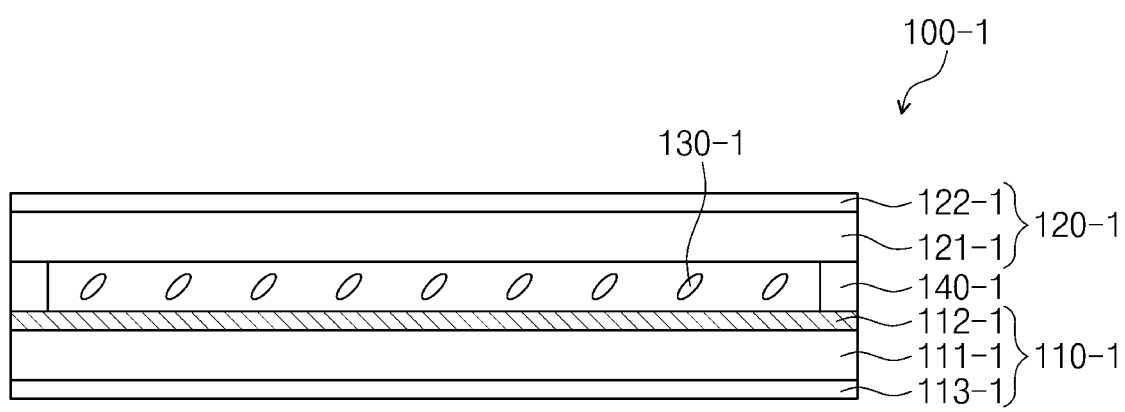
FIG. 4 is a cross-sectional view of an embodiment of a display panel.

FIG. 4 is a cross-sectional view of an embodiment of a display panel 100-1.

Referring to FIG. 4, the display panel 100-1 may be a light receiving display panel. In an embodiment, for example, the display panel 100-1 may be a liquid crystal display panel. Although not illustrated, a component that generates and/or provides light toward the display panel 100-1 may further be disposed below the display panel 100-1.

The display panel 100-1 may include a first substrate 110-1, a second substrate 120-1, an optical control layer such as a liquid crystal layer 130-1, and a bonding member 140-1.

The first substrate 110-1 may include a first base substrate 111-1, a circuit layer 112-1, and a lower polarization layer 113-1.

The first base substrate 111-1 may be a plastic substrate, a glass substrate, an insulating film, or a laminated structure including a plurality of insulating layers.

The circuit layer 112-1 may be disposed on the first base substrate 111-1. The circuit layer 112-1 may include a plurality of insulating layers, a plurality of conductive layers, a semiconductor layer, and pixel electrodes. The plurality of conductive layers may constitute signal wires or a pixel control circuit (e.g., a transistor). The first substrate 110-1 may be referred to as a transistor substrate.

The lower polarization layer 113-1 may be disposed below the first base substrate 111-1. In an embodiment, the lower polarization layer 113-1 may be between the first base substrate 111-1 and the circuit layer 112-1.

The second substrate 120-1 may include a second base substrate 121-1 and an upper polarization layer 122-1. Although not illustrated, a common electrode, a color filter, and a light shielding layer disposed below the second base substrate 121-1, may further be included in the second substrate 120-1. The second substrate 120-1 may be referred to as an opposite substrate or a color filter substrate.

The second base substrate 121-1 may be a plastic substrate, a glass substrate, an insulating film, or a laminated structure including a plurality of insulating layers. The upper polarization layer 122-1 may be disposed on the second base substrate 121-1.

The liquid crystal layer 130-1 may be disposed between the first substrate 110-1 and the second substrate 120-1. The liquid crystal layer 130-1 may include liquid crystal molecules having dielectric anisotropy. The alignment of the liquid crystal molecules may vary depending on an electric field formed between the common electrode and the pixel electrodes.

The bonding member 140-1 may be disposed between the first substrate 110-1 and the second substrate 120-1 and may be bonded to the first substrate 110-1 and the second substrate 120-1. The bonding member 140-1 may include an organic material such as a photocurable resin and a photoplastic resin, or may include an inorganic material such as a frit seal, and is not limited to any one embodiment.

Hereinafter, a description will be given with respect to the display panel 100 illustrated in FIG. 3. However, the following description may be applied to the display panel 100-1, and may be applied to various display panels in addition to the display panels illustrated in FIGS. 3 and 4.

Figure 5:
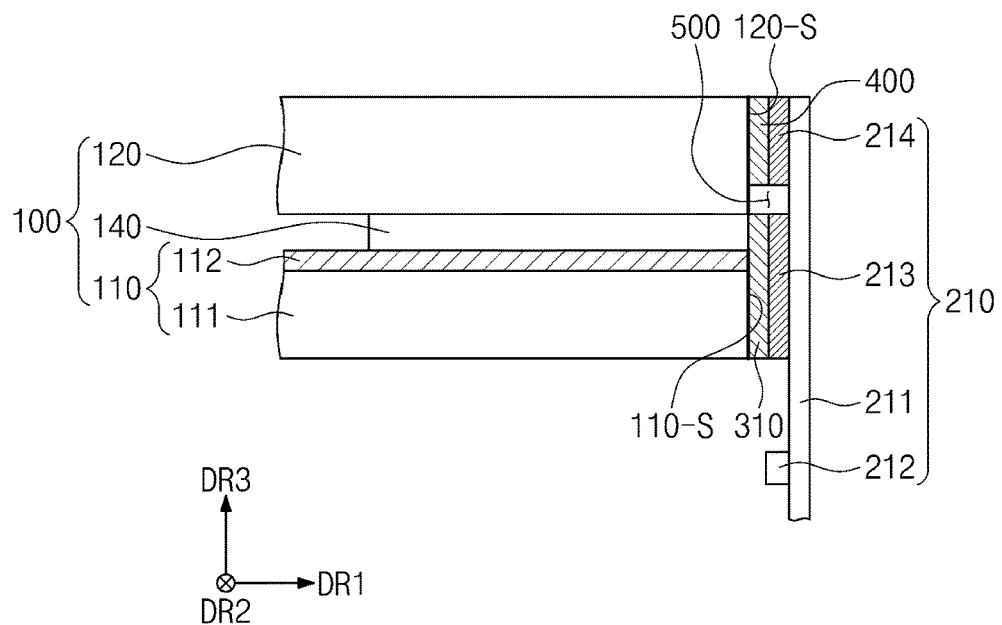
FIG. 5 is an enlarged cross-sectional view taken along line I-I' of FIG. 1.
Figure 6:
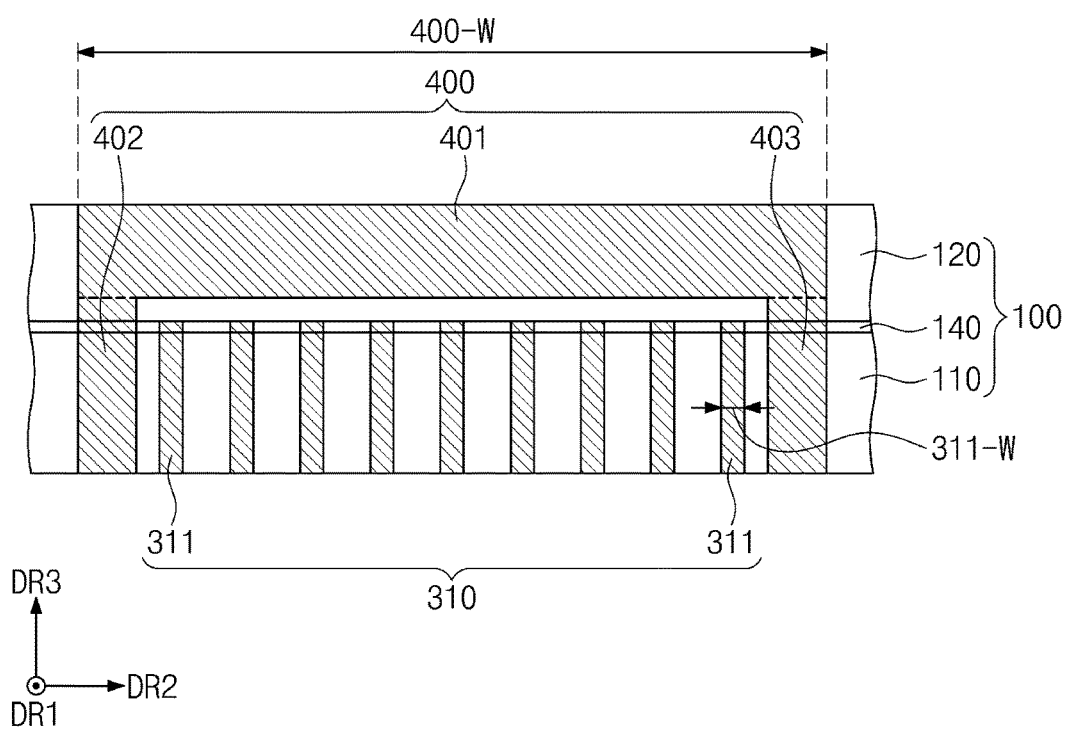
FIG. 6 is an enlarged view of an embodiment of a portion of a display device.

FIG. 5 is an enlarged cross-sectional view taken along line I-I' of FIG. 1, of an embodiment of an end portion of the display device 1000. FIG. 6 is an enlarged cross-sectional view of an embodiment of a portion of the display device 1000. FIG. 6 illustrates a first pad part 310 (hereinafter referred to as a pad part 310) on the first side surface 101 (see FIG. 2). The second and third pad parts 320 and 330 (see FIG. 2) described above may be understood through a description of the pad part 310 in FIGS. 5 and 6 to be given below. That is, one or more embodiment of the pad part 310 may be applied to one or more of the second and third pad parts 320 and 330.

Referring to FIGS. 5 and 6, the pad part 310 may be disposed at the side surface of the display panel 100. The pad part 310 may include a pad 311 through which an electrical signal is provided to the display panel 100 from outside thereof. The pad 311 may be provided in plural (e.g., a plurality of pads 311). The plurality of pads 311 may be arranged along a predetermined direction, for example, along the second direction DR2. The number of the pads 311 constituting the pad part 310 is exemplarily illustrated to be nine in FIG. 6, but is not limited thereto.

An auxiliary layer 400 may be disposed on a side surface of the display panel 100. The auxiliary layer 400 may be disposed on a same side surface of the display panel 100 at which the pad part 310 is disposed. The auxiliary layer 400 may be an auxiliary pattern which corresponds to the pad part 310. A single one of the auxiliary pattern may correspond to each of the pads 311 of the pad part 310. The auxiliary layer 400 may be disposed to be spaced apart from the pad part 310. Referring to FIGS. 5 and 6, the auxiliary layer 400 is spaced apart from the pad part 310 along the second direction DR2 and the third direction DR3. In a plan view of the side surface of the display panel 100, the auxiliary layer 400 may surround at least a portion of the pad part 310. (e.g., The auxiliary layer 400 may surrounds at least a portion of an area where the pads 311 is disposed) Referring to FIG. 6, for example, the auxiliary layer 400 may be disposed adjacent to the pad part 310 at a region above, a region on the left of and a region on the right of the pad part 310. A shape of the auxiliary layer 400 may be open along the third direction DR3, such as being open toward the first substrate 110. The auxiliary layer 400 may be electrically floating.

In an embodiment, the auxiliary layer 400 may be disposed in a same layer as the pad part 310. In an embodiment, for example, both the auxiliary layer 400 and the pad part 310 may be disposed on the side surface of the display panel 100. The auxiliary layer 400 and the pad part 310 may be disposed in a same plane as each other (e.g., being coplanar with each other).

A thickness of the auxiliary layer 400 and the pad part 310 may be taken in a direction normal to the side surface of the display panel 100. Referring to FIG. 5, for example, the thickness of the auxiliary layer 400 and the pad part 310 may be defined along the first direction DR1. In an embodiment, the thicknesses of the auxiliary layer 400 and the pad part 310 may be the same as each other, but are not limited thereto.

In an embodiment, the auxiliary layer 400 may include a first auxiliary region 401, a second auxiliary region 402, and a third auxiliary region 403. The first auxiliary region 401 may be disposed to be spaced apart from the pads 311 along a direction crossing an arrangement direction of the pads 311, for example, along the third direction DR3 (e.g., a thickness direction of the display panel 100). A length of the second auxiliary region 402 may extend along the third direction DR3 from a first end of the first auxiliary region 401. A length of the third auxiliary region 403 may extend along the third direction DR3 from a second end of the first auxiliary region 401 which is opposite to the first end thereof. The auxiliary layer 400 may define a discrete pattern corresponding to the pad part 310, but the invention is not limited thereto. The discrete pattern may be provided in plural along a side surface of the display panel 100.

In an embodiment, the pads 311 may be disposed on a side surface 110-S of the first substrate 110. The first auxiliary region 401 may be disposed on a side surface 120-S of the second substrate 120. The second auxiliary region 402 and the third auxiliary region 403 may be disposed to be spaced apart from each other (e.g., facing each other) with the pad part 310 therebetween. The first auxiliary region 401 connects the second auxiliary region 402 and the third auxiliary region 403 to each other, at first ends of the second auxiliary region 402 and the third auxiliary region 403. The second auxiliary region 402 and the third auxiliary region 403 may extend to be disposed on both the side surface 110-S of the first substrate 110 and the side surface 120-S of the second substrate 120. That is, a portion of the auxiliary layer 400 may be disposed on the side surface 110-S of the first substrate 110, and another portion thereof may be disposed on the side surface 120-S of the second substrate 120.

In an embodiment, the pads 311 and the auxiliary layer 400 may include a same material as each other. In an embodiment of providing the display device 1000, the pads 311 and the auxiliary layer 400 may be provided through a same process. In the same process, the pads 311 and the auxiliary layer 400 may respectively be portions of a same material layer. In an embodiment of providing the display device 1000, the pads 311 and the auxiliary layer 400 may be provided by depositing a metal material in a single layer or a plurality of layers, and then by patterning the same such as by using a laser. However, the invention is not limited thereto, and the auxiliary layer 400 may include or be formed of a material different from a material of the pads 311.

The material of the pads 311 and the auxiliary layer 400 may include a metal or a metal alloy, and may include a single layer structure or a laminated structure of a plurality of layers. In an embodiment, for example, each of the pads 311 and the auxiliary layer 400 may include or be formed of a metal material including copper (Cu), silver (Ag), gold (Au), aluminum (Al), or the like. Alternatively, each of the pads 311 and the auxiliary layer 400 may include a first sub-layer including copper (Cu) and a second sub-layer including tin (Sn) which are sequentially laminated in order from the side surface of the display panel 100. Alternatively, the pads 311 and the auxiliary layer 400 may include a first sub-layer including titanium (Ti), a second sub-layer including aluminum (Al), and a third sub-layer including titanium (Ti) which are sequentially laminated in order from the side surface of the display panel 100. Alternatively, the pads 311 and the auxiliary layer 400 may include a first sub-layer including a nickel-chromium (NiCr) alloy, a second sub-layer including copper (Cu), and a third sub-layer including an indium-tin (InSn) alloy which are sequentially laminated in order from the side surface of the display panel 100. However, these are only presented as examples, and a material of the pads 311 and the auxiliary layer 400 is not limited to the examples above.

Figure 7:
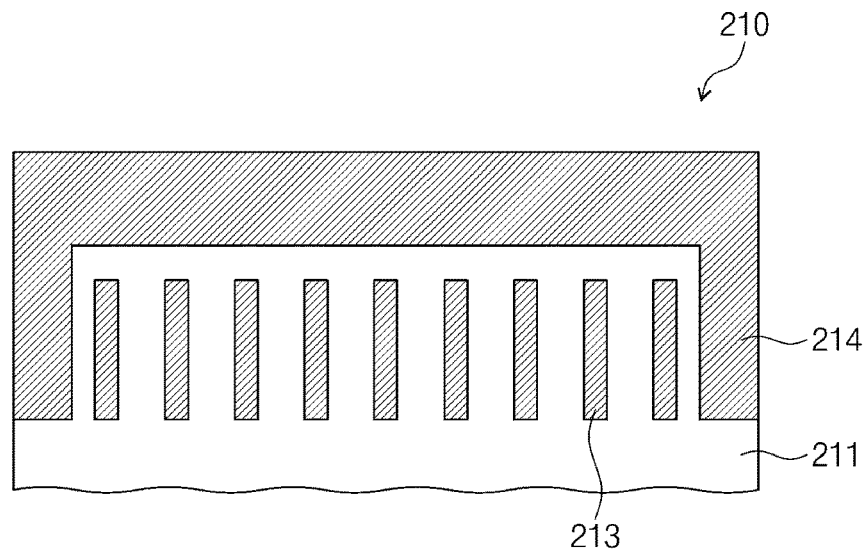
FIG. 7 is an enlarged view of an embodiment of a portion of a circuit unit.

FIG. 7 is an enlarged plan view of an embodiment of a portion of one of the circuit units. FIG. 7 illustrates a first circuit unit 210 (hereinafter referred to as a circuit unit 210), and the second and third circuit units 220 and 230 (see FIG. 2) described above may be understood through a description of the circuit unit 210 to be given below. That is, one or more embodiment of the circuit unit 210 may be applied to one or more of the second and third circuit units 220 and 230.

Referring to FIGS. 5, 6, and 7, a same one of the circuit unit 210 may be coupled to the pad part 310 and the auxiliary layer 400. The circuit unit 210 may cover at least a portion of the pads 311 and the auxiliary layer 400, and may be electrically connected to the display panel 100 through the pads 311.

The circuit unit 210 may include the first circuit film 211 (hereinafter referred to as a circuit film 211), the first drive chip 212 (hereinafter referred to as a drive chip 212), an electrode 213 provided in plural (e.g., electrodes 213), and an auxiliary electrode 214. Within the circuit unit 210, the electrodes 213 may be electrically connected to the drive chip 212, and the auxiliary electrode 214 may be electrically floating (e.g., a floating electrode). A total planar area of the circuit unit 210 including the first circuit film 211, the first drive chip 212, the electrodes 213 and the auxiliary electrode 214 may correspond to a planar area of the pads 311 and the auxiliary layer 400, such as to cover at least a portion of the pads 311 and the auxiliary layer 400. The auxiliary layer 400 and the auxiliary electrode 214 may together be referred to as an auxiliary coupling layer.

The electrodes 213 of the circuit unit 210 may be electrically connected to the pads 311 of the pad part 310, respectively. The electrodes 213 may be arranged to be spaced apart from each other along the second direction DR2. The number of the electrodes 213 may correspond to the number of the pads 311. However, the invention is not limited thereto.

Along the first circuit film 211, the auxiliary electrode 214 may be disposed to be spaced apart from the electrodes 213. The auxiliary electrode 214 is coupled to the auxiliary layer 400, and the shape of the auxiliary electrode 214 may correspond to the shape of the auxiliary layer 400.

In an embodiment, the electrodes 213 and the auxiliary electrode 214 may include a same material as each other. However, the invention is not limited thereto, and the electrodes 213 may include or be formed of a material different from a material of the auxiliary electrode 214. In an embodiment, for example, a material of each of the electrodes 213 and the auxiliary electrode 214 may include a metal or a metal alloy, and may include a single layer structure or a laminated structure of a plurality of layers. In an embodiment, for example, the electrodes 213 and the auxiliary electrode 214 may include titanium (Ti), indium (In), or an aluminum-copper (Al—Cu) alloy, but a material constituting the electrodes 213 and the auxiliary electrode 214 is not limited to the examples.

The electrodes 213 and the pads 311 may be directly coupled to each other, and the auxiliary electrode 214 and the auxiliary layer 400 may be directly coupled each other. In an embodiment, for example, by ultrasonic bonding, the electrodes 213 and the pads 311 may be bonded together, and the auxiliary electrode 214 and the auxiliary layer 400 may be directly bonded together. As being "directly coupled" or "directly bonded," elements may form an interface with each other.

An ultrasonic bonding process may be performed by an ultrasonic vibration device. The ultrasonic vibration device may generate a vibration having a predetermined frequency. In an embodiment, the ultrasonic vibration may be applied to the electrodes 213 and the auxiliary electrode 214, through the circuit film 211.

By the ultrasonic vibration, frictional heat is generated at surfaces of the electrodes 213 and the pads 311 which contact each other, and at surfaces of the auxiliary electrode 214 and the auxiliary layer 400 which contact each other. The frictional heat may melt portions of the electrodes 213 and the pads 311 at the contact surfaces thereof and portions of the auxiliary electrode 214 and the auxiliary layer 400 at the contact surfaces thereof, so that metal diffusion may occur. As a result, the electrodes 213 and the pads 311 may be bonded together, and the auxiliary electrode 214 and the auxiliary layer 400 may be bonded together.

A second width 400-W along the second direction DR2 of the auxiliary layer 400 may be greater than a first width 311-W along the second direction DR2 of each of the pads 311. The first width 311-W and the second width 400-W may respectively be maximum widths along the second direction DR2 of the auxiliary layer 400 and the pads 311.

According to an embodiment, the pads 311 and the electrodes 213 of the circuit unit 210 may not only be coupled together, but the auxiliary layer 400 and the auxiliary electrode 214 of a same one of the circuit unit 210 may also be coupled together. Thus, the planar area of a coupling region at which the circuit unit 210 is coupled to the side surface of the display panel 100 may be expanded by the auxiliary layer 400 and the auxiliary electrode 214. Accordingly, the circuit unit 210 may be more stably coupled to the side surface of the display panel 100. As a result, coupling reliability of the circuit unit 210 and the display panel 100 may be enhanced, and thus reliability of the display device 1000 (see FIG. 1) may be improved.

In an embodiment, the auxiliary electrode 214 may be spaced apart from the electrodes 213, and the auxiliary layer 400 may be spaced apart from the pads 311. Accordingly, a space 500 or gap may be respectively defined between the auxiliary electrode 214 and the electrodes 213 and between the auxiliary layer 400 and the pads 311.

Figure 8:
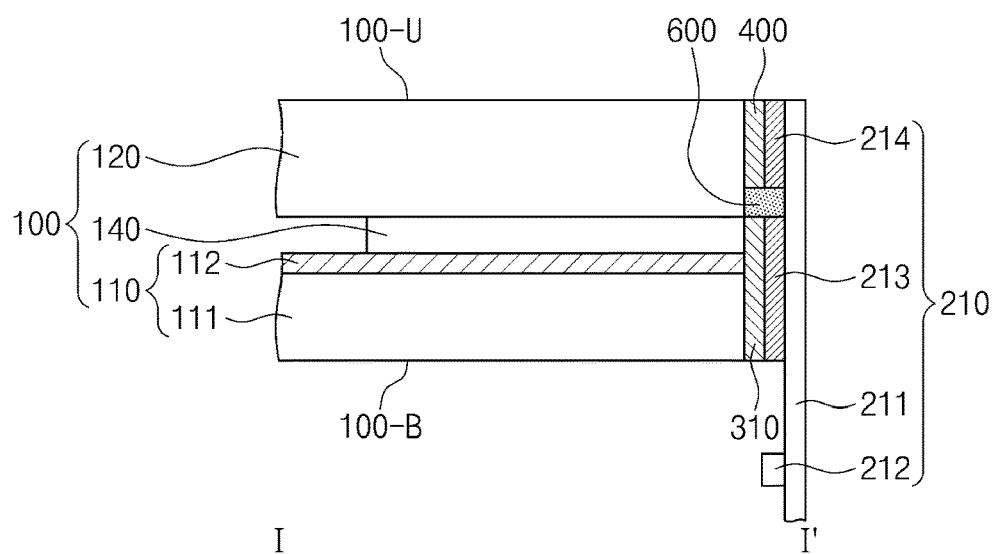
FIG. 8 is an enlarged cross-sectional view taken along line I-I' of FIG. 1.
Figure 9:
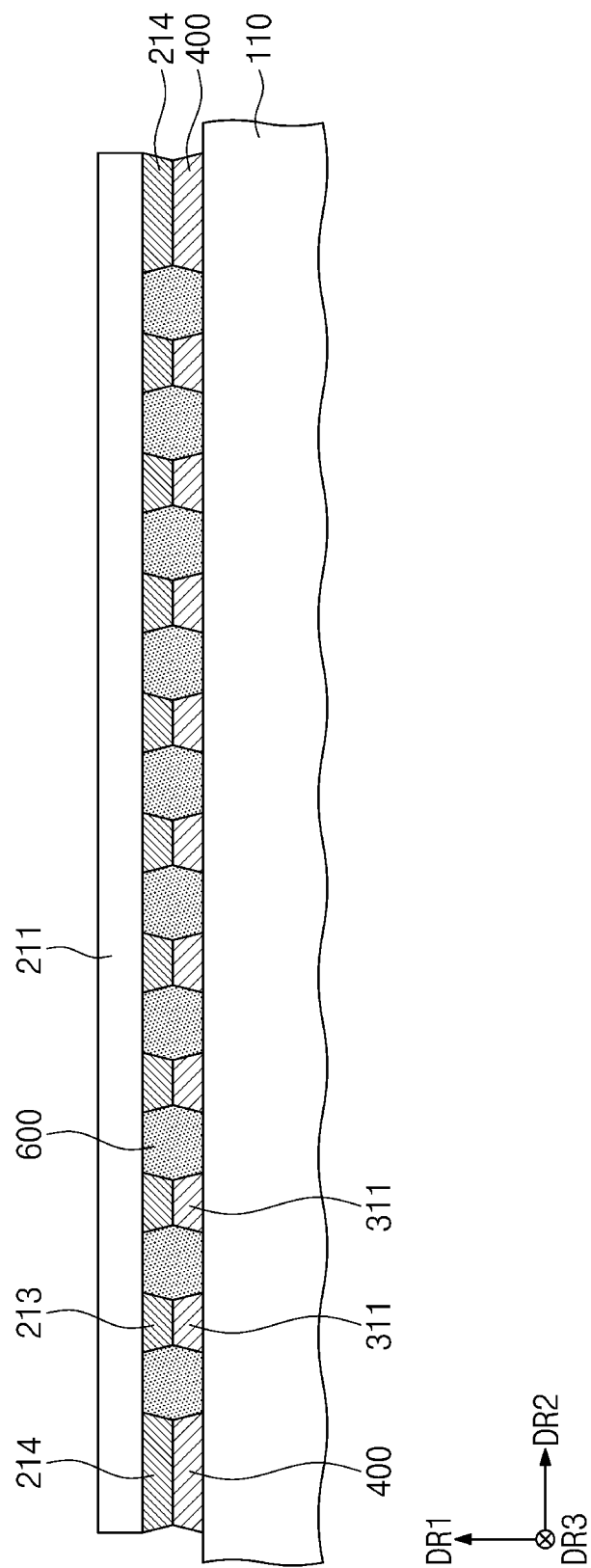
FIG. 9 is an enlarged view of an embodiment of a portion of a display device.

FIG. 8 is an enlarged cross-sectional view taken along line I-I' of FIG. 1, of an embodiment of an end portion of the display device 1000. FIG. 9 is an enlarged plan view of an embodiment of an end portion of a display device 1000.

Referring to FIGS. 8 and 9, a filling layer 600 (e.g., filler) may be disposed between the circuit unit 210 and the display panel 100. In an embodiment of providing the display device 1000, after the circuit unit 210 is coupled to the display panel 100, the filling layer 600 may be provided in the space 500 between the pads 311 and the space 500 between the electrodes 213. The filling layer 600 may be referred to as an underfill resin.

The filling layer 600 may be an insulating resin. In an embodiment, for example, the filling layer 600 may include a thermosetting resin, and a material of the filling layer 600 is not limited to the above example. The filling layer 600 may fill a space 500 between the circuit unit 210 and the display panel 100. The coupling reliability of the circuit unit 210 and the display panel 100 may be improved by the filling layer 600.

According to an embodiment, the display panel 100 may include a top surface 100-U at which an image is provided (e.g., image display surface) and a bottom surface 100-B facing the top surface 100-U. The auxiliary layer 400 may be disposed closer to the top surface 100-U than the pad part 310. In an embodiment, for example, at least a portion of the auxiliary layer 400 may be disposed between the top surface 100-U and the pad part 310, along the third direction DR3 (e.g., along the thickness direction of the display panel 100).

In an embodiment of providing the display device 1000, during a process in which the filling layer 600 is provided, the auxiliary layer 400 and the auxiliary electrode 214 may serve as a dam for a filling material forming the filling layer 600. In an embodiment, for example, during the process of injecting a material forming the filling layer 600, the auxiliary layer 400 and the auxiliary electrode 214 may reduce or effectively prevent overflowing of the material further than the top surface 100-U of the display panel 100.

Figure 10:
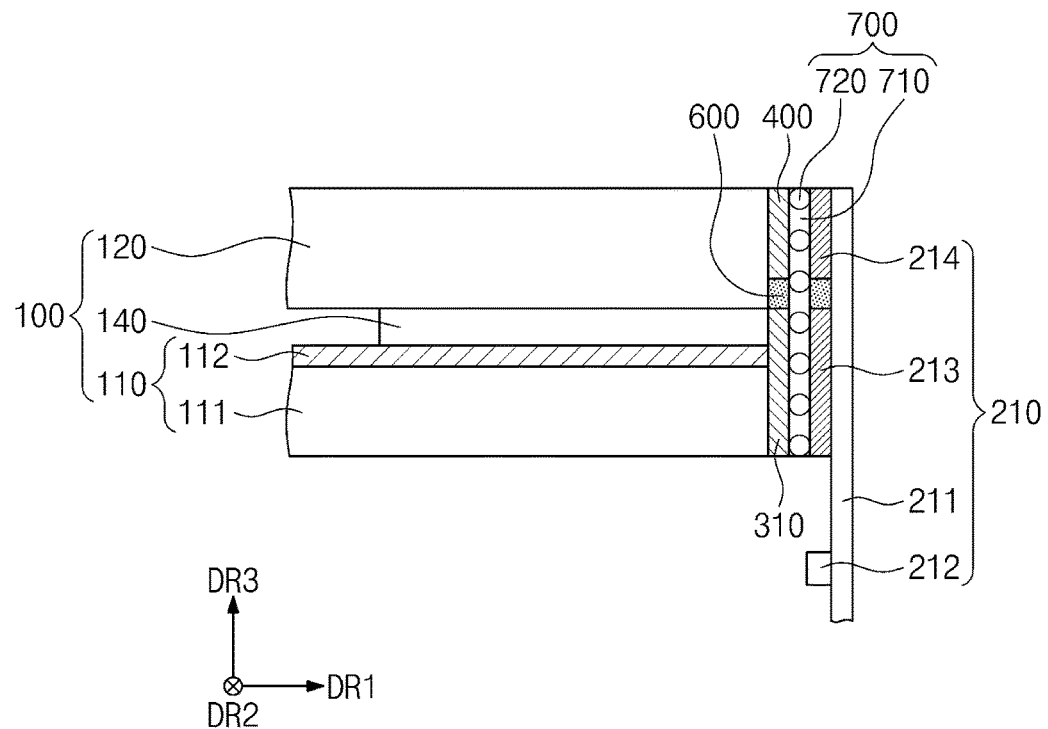
FIG. 10 is an enlarged cross-sectional view taken along line I-I' of FIG. 1.

FIG. 10 is an enlarged cross-sectional view taken along line I-I' of FIG. 1, of an embodiment of an end portion of the display device 1000.

Referring to FIG. 10, an anisotropic conductive film 700 may further be disposed between the electrodes 213 and the pad part 310 and between the auxiliary layer 400 and the auxiliary electrode 214.

The anisotropic conductive film 700 may include an adhesive layer 710 and a conductive particle 720 provided in plural (e.g., conductive particles 720) which are dispersed in the adhesive layer 710. The adhesive layer 710 may include a thermosetting resin. When a predetermined temperature and a predetermined pressure are applied to the anisotropic conductive film 700, the pad part 310 and the electrodes 213 of the circuit unit 210 may be electrically connected to each other by the conductive particles 720.

The filling layer 600 may be provided in the space 500 which is empty between the electrodes 213 and the space 500 between the pads 311 (see FIG. 9). In an embodiment of providing the display device 1000, during a process in which the filling layer 600 is provided, the auxiliary layer 400 and the auxiliary electrode 214 may serve as a dam. Accordingly, during the process of injecting a material for forming the filling layer 600, the auxiliary layer 400 and the auxiliary electrode 214 may reduce or effectively prevent overflowing of the material further from the top surface 100-U of the display panel 100.

Figure 11:
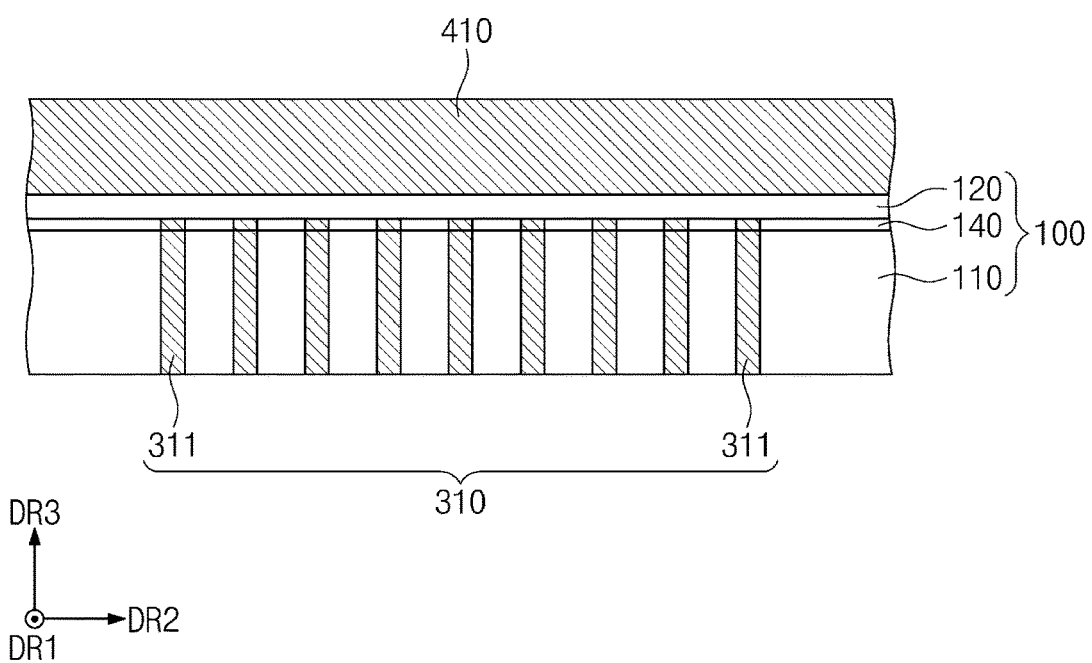
FIG. 11 is an enlarged view of an embodiment of a portion of a display device.
Figure 12:
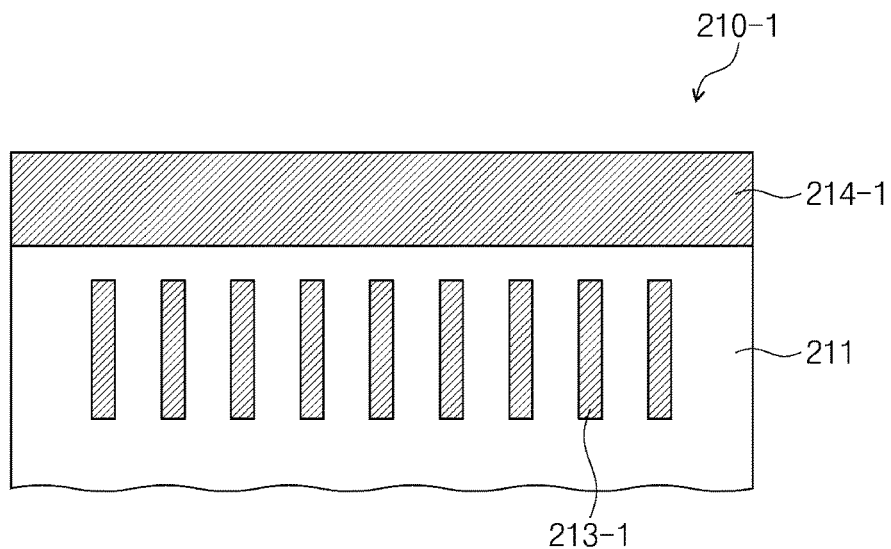
FIG. 12 is an enlarged view of an embodiment of a portion of a circuit unit.
Figure 12:
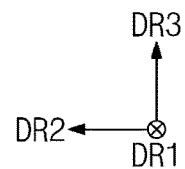

FIG. 11 is an enlarged view of an embodiment of a portion of a display device 1000. FIG. 12 is an enlarged view of an embodiment of a portion of a circuit unit 210-1.

Referring to FIGS. 11 and 12, the pads 311 may be arranged to be spaced apart from each other along the second direction DR2, and an auxiliary layer 410 may have a shape which lengthwise extends along the second direction DR2. In an embodiment, the length of the auxiliary layer 410 along the second direction DR2, may be the same as or smaller than the length of the display panel 100 along the second direction DR2. In an embodiment, a length of a same auxiliary layer 410 may correspond to more than one pad part 310 along the side surface of the display panel 100.

The auxiliary layer 410 may surround at least a portion of the pad part 310. In an embodiment, for example, the auxiliary layer 410 may be disposed in a region above the pad part 310.

A circuit unit 210-1 may include an electrode 213-1 provided in plural (e.g., electrodes 213-1) coupled to the pads 311 in one-to-one correspondence, and an auxiliary electrode 214-1 coupled to the auxiliary layer 410. The auxiliary electrode 214-1 may have a shape lengthwise extending along the second direction DR2. A shape and/or a dimension of the auxiliary electrode 214-1 may correspond to the length of the auxiliary layer 410, but is not limited thereto.

According to an embodiment, the electrodes 213-1 may be coupled to the pads 311, and the auxiliary electrode 214-1 may be coupled to the auxiliary layer 410. As the auxiliary electrode 214-1 and the auxiliary layer 410 are coupled to each other to increase a planar area at which the circuit unit 210-1 and the first pad part 310 are coupled to each other, coupling reliability of the circuit unit 210-1 relative to the display panel 100 may be improved.

In addition, in an embodiment, a filling layer 600 may further be provided between the electrodes 213-1 and between the pads 311 so as to further improve the coupling reliability of the circuit unit 210-1 relative to the display panel 100. In this case, the auxiliary layer 410 and the auxiliary electrode 214-1 may act as a dam to reduce or effectively prevent overflowing of a filling material further from the top surface 100-U of the display panel 100.

Figure 13:
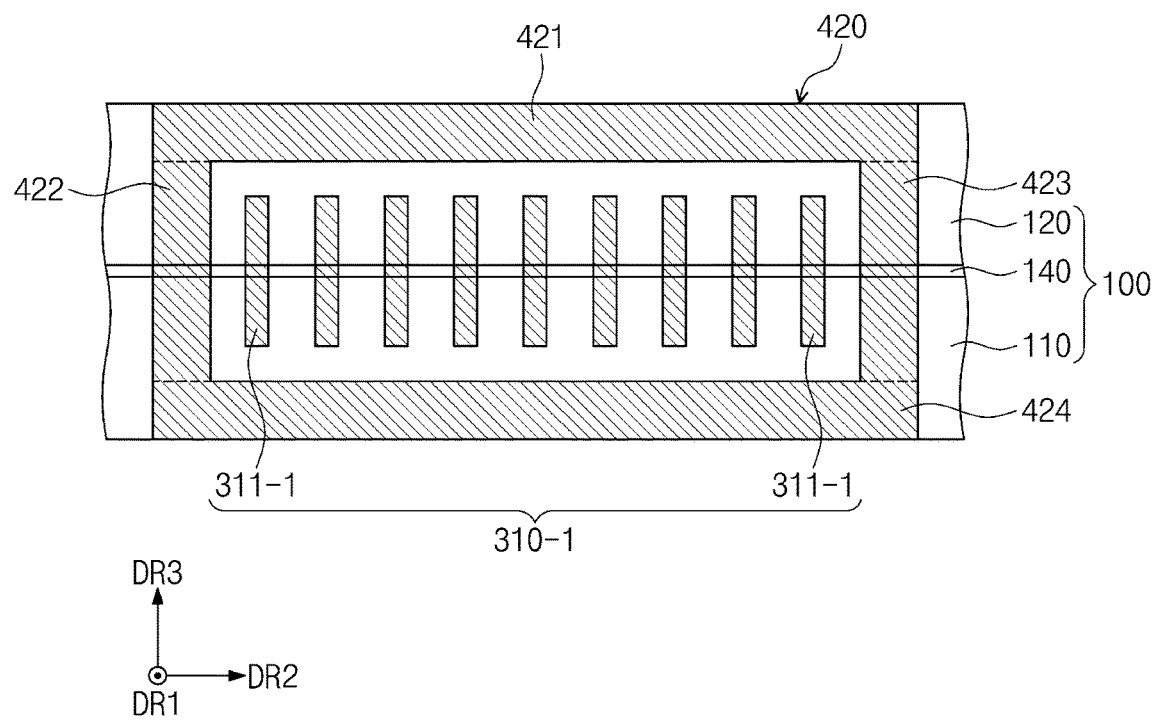
FIG. 13 is an enlarged view of an embodiment of a portion of a display device.
Figure 14:
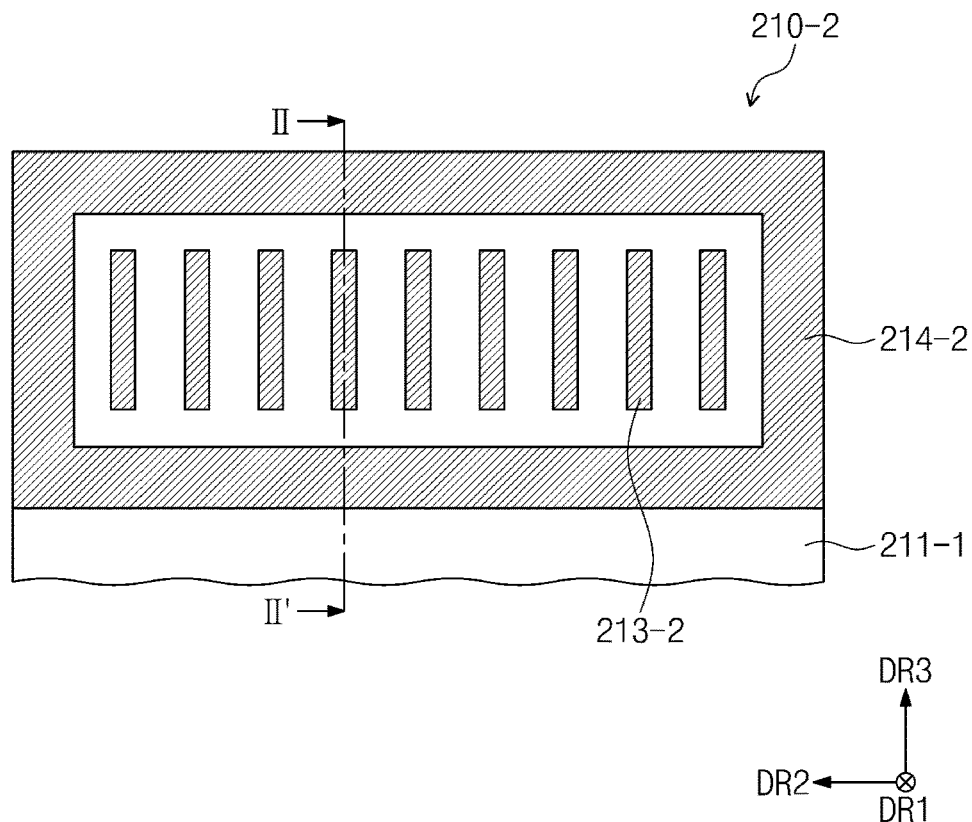
FIG. 14 is an enlarged view of an embodiment of a portion of a circuit unit.

FIG. 13 is an enlarged cross-sectional view of an embodiment of a portion of a display device 1000. FIG. 14 is an enlarged view of an embodiment of a portion of a circuit unit 210-2.

Referring to FIGS. 13 and 14, a pad part 310-1 may include a pad 311-1 provided in plural (e.g., pads 311-1), and the pads 311-1 may be arranged to be spaced apart from each other along the second direction DR2. Each of the pads 311-1 may extend to be disposed on the side surface of the first substrate 110 and the side surface of the second substrate 120, extending across the bonding member 140.

In a plan view of the side surface of the display panel 100, an auxiliary layer 420 may completely surround the pad part 310-1. In an embodiment, for example, the auxiliary layer 420 may include a first auxiliary region 421, a second auxiliary region 422, a third auxiliary region 423, and a fourth auxiliary region 424. The fourth auxiliary region 424 connects the second auxiliary region 402 and the third auxiliary region 403 to each other, at second ends of the second auxiliary region 402 and the third auxiliary region 403 which are opposite to the first ends thereof. The first auxiliary region 421 and the fourth auxiliary region 424 may lengthwise extend along the second direction DR2, and the second auxiliary region 422 and the third auxiliary region 423 may lengthwise extend along the third direction DR3. The first auxiliary region 421 and the fourth auxiliary region 424 may be disposed to be spaced apart from each other (e.g., face each other) with the pad part 310-1 therebetween, and the second auxiliary region 422 and the third auxiliary region 423 may be disposed to be spaced apart from each other with the pad part 310-1 therebetween.

A circuit unit 210-2 may include an electrode 213-2 provided in plural (e.g., electrodes 213-2) coupled to the pads 311-1 in one-to-one correspondence, and an auxiliary electrode 214-2 coupled to the auxiliary layer 420. The auxiliary electrode 214-2 may have a planar shape corresponding to a planar shape of the auxiliary layer 420.

According to an embodiment, the electrodes 213-2 may be coupled to the pads 311-1, and the auxiliary electrode 214-2 may be coupled to the auxiliary layer 420. Coupling may be additionally performed by the auxiliary electrode 214-2 and the auxiliary layer 420 in all of regions above, below, on the left of, and on the right of the pad part 310-1. Accordingly, the planar area of a region at which the circuit unit 210-2 and the pad part 310-1 are coupled to each other may be increased by the auxiliary layer 420 and the auxiliary electrode 214-2. Accordingly, the circuit unit 210-2 may be more stably coupled to the side surface of the display panel 100. As a result, coupling reliability of the circuit unit 210-2 and the display panel 100 may be improved, and thus reliability of a display device 1000 (see FIG. 1) may be improved.

Figure 15:
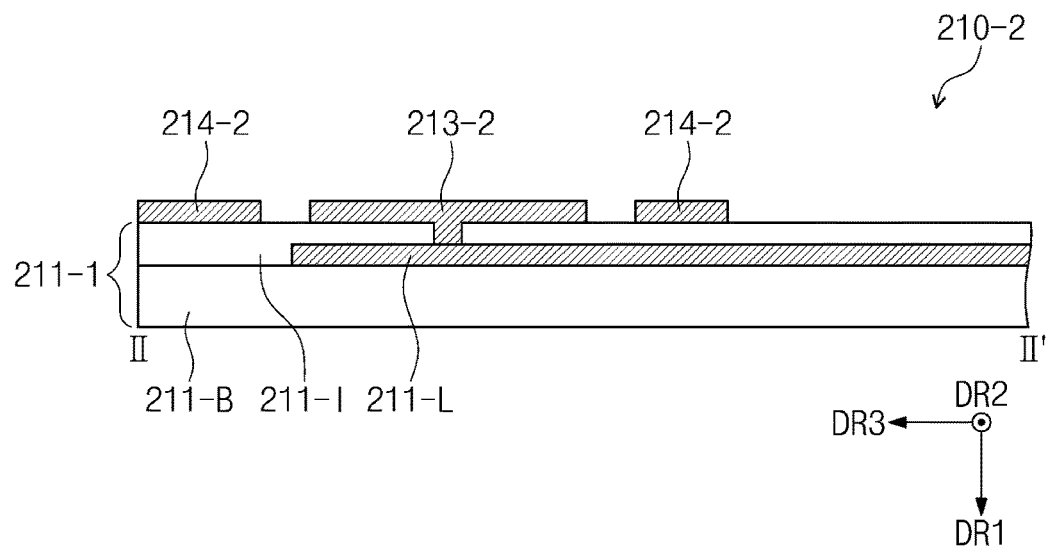
FIG. 15 is an enlarged cross-sectional view taken along line II-II' of FIG. 14.

FIG. 15 is a cross-sectional view taken along line II-II' of FIG. 14.

Referring to FIG. 15, a circuit film 211-1 may include a base film 211-B, a circuit wire 211-L, and an insulating layer 211-I arranged along a thickness direction of the circuit film 211-1 (e.g., along the first direction DR1).

The circuit wire 211-L may be disposed on the base film 211-B. The insulating layer 211-I may cover the circuit wire 211-L. The electrodes 213-2 and the auxiliary electrode 214-2 may be disposed facing the base film 211B with the insulating layer 211-I therebetween.

The circuit wire 211-L may be electrically connected to the first drive chip 212 (see FIG. 2). The circuit wire 211-L may be provided in plurality (e.g., circuit wires 211-L) along the base film 211-B, and each of the electrodes 213-2 may be electrically connected to a corresponding one of the circuit wires 211-L. In an embodiment, for example, each of the electrodes 213-2 may extend into and/or through the insulating layer 211-I, to be connected to a corresponding one of the circuit wire 211-L.

The auxiliary electrode 214-2 may not be electrically connected to the circuit wire 211-L and may be electrically floating (e.g., a floating electrode).

According to an embodiment, not only the pads 311 disposed on the side surface of the display panel 100 and the electrodes 213 of the circuit unit 210 may be coupled to each other, but the auxiliary layer 400 disposed on the side surface of the display panel 100 and the auxiliary electrode 214 of the circuit unit 210 may be coupled to each other. Thus, a total planar area at which the circuit unit 210 and the elements disposed on the side surface of the display panel 100 are coupled to each other, may be expanded by the auxiliary layer 400 and the auxiliary electrode 214. Accordingly, the circuit unit 210 may be more stably coupled to the side surface of the display panel 100. As a result, the reliability of the display device 1000 may be improved.

In addition, according to an embodiment, the filling layer 600 may further be provided between the pads 311 and between the electrodes 213. In this case, the auxiliary layer 400 and the auxiliary electrode 214 may serve as a dam in a process in which material for providing the filling layer 600 is provided between the pads 311 and between the electrodes 213. Accordingly, the auxiliary layer 400 and the auxiliary electrode 214 may reduce or effectively prevent overflowing of a material forming the filling layer 600 further than the top surface 100-U of the display panel 100.

Although embodiments have been described herein, it is understood that various changes and modifications can be made by those skilled in the art within the spirit and scope of the invention defined by the following claims or the equivalents. Therefore, the embodiments described herein are not intended to limit the technical spirit and scope of the invention, and all technical spirit within the scope of the following claims or the equivalents will be construed as being included in the scope of the invention.

What is claimed is:

1. A display device comprising:
    a display panel comprising a side surface extended along a thickness direction of the display panel;
    a plurality of pads arranged spaced apart from each other along a first direction crossing the thickness direction of the display panel, electrically connected to the display panel, and disposed on the side surface of the display panel and having a material;
    an auxiliary layer in a same layer as the plurality of pads, disposed on the side surface of the display panel and having a material the same as the material of the plurality of pads, the auxiliary layer spaced apart from the plurality of pads along the thickness direction of the display panel; and
    a circuit member facing the side surface of the display panel with both the plurality of pads and the auxiliary layer therebetween, and electrically coupled to both the plurality of pads and the auxiliary layer,
    wherein a width along the first direction of each of the plurality of pads is smaller than a width along the first direction of the auxiliary layer.

2. The display device of claim 1, wherein the circuit member comprises a plurality of electrodes facing the plurality of pads and an auxiliary electrode facing the auxiliary layer.

3. The display device of claim 2, wherein
within the circuit member, the plurality of electrodes and the auxiliary electrode comprise a same material as each other, and
a shape of the auxiliary electrode of the circuit member corresponds to a shape of the auxiliary layer.

4. The display device of claim 2, wherein
the plurality of pads is directly electrically coupled to the plurality of electrodes of the circuit member, and
the auxiliary layer is directly coupled to the auxiliary electrode of the circuit member.

5. The display device of claim 2, further comprising an anisotropic conductive film which is between the plurality of pads and the plurality of electrodes and couples the plurality of pads to the plurality of electrodes.

6. The display device of claim 1, wherein the plurality of pads define a space therebetween,
further comprising at the space defined by the plurality of pads, a filling layer between the circuit member and the display panel.

7. The display device of claim 1, wherein at the side surface of the display panel,
the auxiliary layer extends along an area of the plurality of pads, in both the first direction and the thickness direction of the display panel.

8. The display device of claim 1, wherein at the side surface of the display panel,
the auxiliary layer extends in the first direction and is spaced apart from each of the plurality of pads along the thickness direction of the display panel.

9. The display device of claim 1, wherein at the side surface of the display panel,
the auxiliary layer comprises:
a first auxiliary region extended along the first direction and spaced apart from each of the plurality of pads along the thickness direction of the display panel,
a second auxiliary region extended along the thickness direction of the display panel, from a first end of the first auxiliary region, and spaced apart from the plurality of pads along the first direction, and
a third auxiliary region extended along the thickness direction of the display panel, from a second end of the first auxiliary region which is opposite to the first end thereof, and spaced apart from the plurality of pads along the first direction,
wherein the first auxiliary region connects the second auxiliary region and the third auxiliary region to each other.

10. The display device of claim 9, wherein at the side surface of the display panel,
the auxiliary layer further comprises a fourth auxiliary region connecting the second auxiliary region and the third auxiliary region to each other, the fourth auxiliary region facing the first auxiliary region with the plurality of pads therebetween, and
the plurality of pads is surrounded by the auxiliary layer including the first auxiliary region, the second auxiliary region, the third auxiliary region, and the fourth auxiliary region.

11. The display device of claim 1, wherein
the display panel further comprises:
a first substrate including a side surface, and
a second substrate facing the first substrate and including a side surface, and at the side surface of the display panel,
the plurality of pads corresponds to the side surface of the first substrate, and
the auxiliary layer corresponds to the side surface of the second substrate.

12. The display device of claim 1, wherein
the display panel further comprises:
a first substrate including a side surface, and
a second substrate facing the first substrate and including a side surface, and at the side surface of the display panel,
the plurality of pads corresponds to both the side surface of the first substrate and the side surface of the second substrate, and
the auxiliary layer corresponds to both the side surface of the first substrate and the side surface of the second substrate.

13. The display device of claim 1, wherein
the display panel further comprises an image display surface defining a top surface, and a bottom surface which is opposite to the top surface along the thickness direction of the display panel, and
along the thickness direction of the display panel, the auxiliary layer is between the top surface and the plurality of pads.

14. A display device comprising:
a display panel comprising a side surface extended along a thickness direction of the display panel and a first direction which crosses the thickness direction;
a plurality of pads disposed on the side surface of the display panel, arranged spaced apart from each other along the first direction and through which an electrical signal is provided to the display panel from outside thereof;
an auxiliary layer disposed on the side surface of the display panel and spaced apart from the plurality of pads, the auxiliary layer comprising a first auxiliary region extending in the first direction along the plurality of pads and spaced apart in the thickness direction from the plurality of pads; and
a circuit member facing the side surface of the display panel with each of the plurality of pads and the auxiliary layer therebetween, the circuit member comprising:
a plurality of electrodes electrically coupled to the plurality of pads, and
an auxiliary electrode spaced apart from the plurality of electrodes along the thickness direction, the auxiliary electrode coupled to the auxiliary layer,
wherein a width along the first direction of each of the plurality of pads is smaller than a width along the first direction of the auxiliary layer.

15. The display device of claim 14, wherein
the plurality of pads and the auxiliary layer comprise a same material as each other, and
the plurality of electrodes and the auxiliary electrode comprise a same material as each other.

16. The display device of claim 14, wherein the plurality of pads define a space therebetween,
further comprising at the space defined by the plurality of pads, a filling layer between the circuit member and the display panel.

17. The display device of claim 14, wherein
the display panel further comprises an image display surface defining a top surface, and a bottom surface which is opposite to the top surface along a thickness direction of the display panel which crosses the first direction, and along the thickness direction of the display panel, the auxiliary layer is between the top surface and the plurality of pads.

18. The display device of claim 14, wherein the auxiliary layer further comprises:
 a second auxiliary region extended along a thickness direction of the display panel, from a first end of the first auxiliary region, and spaced apart from the plurality of pads along the first direction, and
 a third auxiliary region extended along the thickness direction from a second end of the first auxiliary region which is opposite to the first end thereof, and spaced apart from the plurality of pads along the first direction,
 wherein the first auxiliary region connects the second auxiliary region and the third auxiliary region to each other.

19. The display device of claim 18, wherein
 the auxiliary layer further comprises a fourth auxiliary region connecting the second auxiliary region and the third auxiliary region to each other, the fourth auxiliary region spaced apart from the first auxiliary region with the plurality of pads therebetween, and
 the plurality of pads is surrounded by the auxiliary layer including the first auxiliary region, the second auxiliary region, the third auxiliary region, and the fourth auxiliary region.

* * * * *